(12) United States Patent
Lee et al.

(10) Patent No.: US 8,797,879 B2
(45) Date of Patent: Aug. 5, 2014

(54) METHOD OF TRANSMITTING AND RECEIVING STATUS REPORT IN A MOBILE COMMUNICATION SYSTEM

(75) Inventors: Young Dae Lee, Anyang-si (KR); Sung Jun Park, Anyang-si (KR); Seung June Yi, Anyang-si (KR); Sung Duck Chun, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 12/312,984

(22) PCT Filed: Dec. 7, 2007

(86) PCT No.: PCT/KR2007/006360
§ 371 (c)(1),
(2), (4) Date: Nov. 4, 2009

(87) PCT Pub. No.: WO2008/084985
PCT Pub. Date: Jul. 17, 2008

(65) Prior Publication Data
US 2010/0097936 A1   Apr. 22, 2010

Related U.S. Application Data

(60) Provisional application No. 60/869,073, filed on Dec. 7, 2006.

(30) Foreign Application Priority Data

Jan. 11, 2007   (KR) .......................... 10-2007-0003282

(51) Int. Cl.
*H04W 36/00* (2009.01)
*H04W 28/00* (2009.01)

(52) U.S. Cl.
CPC .............. *H04W 36/00* (2013.01); *H04W 28/00* (2013.01)

USPC .......................................................... 370/241

(58) Field of Classification Search
None
See application file for complete search history.

(56) References Cited

U.S. PATENT DOCUMENTS

| 6,374,115 | B1 | 4/2002 | Barnes et al. |
| 6,421,359 | B1 | 7/2002 | Bennett et al. |

(Continued)

FOREIGN PATENT DOCUMENTS

| CN | 1518236 | 8/2004 |
| CN | 1595362 | 3/2005 |

(Continued)

OTHER PUBLICATIONS

Samsung: "DL Control Channel Structure: Overview", 3GPP TSG-RAN WG1, R1-062534, Oct. 9, 2006, sections 1-4.

(Continued)

*Primary Examiner* — Mark Rinehart
*Assistant Examiner* — Maharishi Khirodhar
(74) *Attorney, Agent, or Firm* — Mckenna Long & Aldridge LLP

(57) ABSTRACT

A method of transmitting and receiving a status report in a mobile communication system and a transmitter for the same are disclosed. A method of transmitting a status report in a mobile communication system includes triggering transmission of one status report, constituting the status report by using at least two status data blocks, which include reception status information of a plurality of data blocks transmitted from a transmitting side and indication information indicating that the data blocks are included in the status report, and transmitting the at least two status data blocks to the transmitting side.

10 Claims, 7 Drawing Sheets

(56) References Cited

U.S. PATENT DOCUMENTS

| | | | |
|---|---|---|---|
| 6,470,391 B2 * | 10/2002 | Takamoto et al. | 709/227 |
| 6,665,313 B1 | 12/2003 | Chang et al. | |
| 6,697,347 B2 | 2/2004 | Ostman et al. | |
| 6,778,501 B1 * | 8/2004 | Malmgren et al. | 370/236 |
| 7,006,464 B1 | 2/2006 | Gopalakrishnan et al. | |
| 7,054,288 B2 | 5/2006 | Sternberg et al. | |
| 7,158,504 B2 | 1/2007 | Kadaba et al. | |
| 7,295,573 B2 | 11/2007 | Yi et al. | |
| 7,359,924 B2 * | 4/2008 | Balachandran et al. | 1/1 |
| 7,542,457 B2 | 6/2009 | Wu | |
| 7,590,181 B2 | 9/2009 | Awad et al. | |
| 7,593,694 B2 | 9/2009 | Michel et al. | |
| 7,606,154 B1 | 10/2009 | Lee | |
| 7,623,483 B2 | 11/2009 | Yi et al. | |
| 7,639,644 B2 | 12/2009 | Sternberg et al. | |
| 7,646,742 B2 | 1/2010 | Petrovic et al. | |
| 7,650,559 B2 | 1/2010 | Nishibayashi et al. | |
| 7,743,310 B2 | 6/2010 | Nishibayashi et al. | |
| 7,764,661 B2 | 7/2010 | Heo et al. | |
| 7,801,563 B2 | 9/2010 | Hara et al. | |
| 7,844,884 B2 | 11/2010 | Roh et al. | |
| 7,848,279 B2 | 12/2010 | Ranta-aho et al. | |
| 7,894,390 B2 | 2/2011 | Nakamata et al. | |
| 7,912,471 B2 | 3/2011 | Patabandi et al. | |
| 8,054,786 B2 | 11/2011 | Wu et al. | |
| 8,054,788 B2 | 11/2011 | Ma et al. | |
| 8,059,681 B2 | 11/2011 | Kim et al. | |
| 8,090,390 B2 | 1/2012 | Lee et al. | |
| 8,208,492 B2 | 6/2012 | Kim et al. | |
| 8,259,687 B2 | 9/2012 | Foore et al. | |
| 2001/0055972 A1 | 12/2001 | Sakata | |
| 2002/0016178 A1 | 2/2002 | Kito | |
| 2002/0170013 A1 | 11/2002 | Bolourchi et al. | |
| 2002/0174276 A1 | 11/2002 | Jiang | |
| 2002/0191641 A1 | 12/2002 | Lhermitte et al. | |
| 2003/0039230 A1 | 2/2003 | Ostman | |
| 2003/0040314 A1 | 2/2003 | Hogan et al. | |
| 2003/0095519 A1 | 5/2003 | Kuo et al. | |
| 2003/0152083 A1 | 8/2003 | Nagata et al. | |
| 2003/0157953 A1 | 8/2003 | Das et al. | |
| 2003/0181221 A1 | 9/2003 | Nguyen | |
| 2003/0207696 A1 | 11/2003 | Willenegger et al. | |
| 2003/0210669 A1 | 11/2003 | Vayanos et al. | |
| 2003/0214935 A1 | 11/2003 | Khan et al. | |
| 2003/0231612 A1 | 12/2003 | Kim et al. | |
| 2004/0103435 A1 | 5/2004 | Yi et al. | |
| 2004/0162071 A1 | 8/2004 | Grilli et al. | |
| 2004/0228294 A1 | 11/2004 | Kim et al. | |
| 2004/0266461 A1 | 12/2004 | Beckmann et al. | |
| 2005/0039101 A1 | 2/2005 | Torsner | |
| 2005/0083943 A1 | 4/2005 | Lee et al. | |
| 2005/0111487 A1 | 5/2005 | Matta et al. | |
| 2005/0207343 A1 | 9/2005 | Han | |
| 2005/0220116 A1 | 10/2005 | Ahn et al. | |
| 2005/0237960 A1 | 10/2005 | Kim | |
| 2005/0250506 A1 | 11/2005 | Beale et al. | |
| 2006/0018294 A1 | 1/2006 | Kynaslahti et al. | |
| 2006/0067238 A1 | 3/2006 | Olsson et al. | |
| 2006/0092911 A1 | 5/2006 | Hwang et al. | |
| 2006/0092973 A1 | 5/2006 | Petrovic et al. | |
| 2006/0114877 A1 | 6/2006 | Heo et al. | |
| 2006/0140158 A1 | 6/2006 | Terry | |
| 2006/0148411 A1 | 7/2006 | Cho et al. | |
| 2006/0153237 A1 | 7/2006 | Hwang et al. | |
| 2006/0183429 A1 | 8/2006 | Anderson | |
| 2006/0203760 A1 | 9/2006 | Fukui et al. | |
| 2006/0245386 A1 | 11/2006 | Hu | |
| 2006/0251019 A1 | 11/2006 | Halsgaard et al. | |
| 2006/0251105 A1 * | 11/2006 | Kim et al. | 370/449 |
| 2006/0268919 A1 | 11/2006 | Malladi et al. | |
| 2007/0014229 A1 | 1/2007 | Hepler et al. | |
| 2007/0047452 A1 | 3/2007 | Lohr et al. | |
| 2007/0064602 A1 | 3/2007 | Jiang | |
| 2007/0091810 A1 | 4/2007 | Kim et al. | |
| 2007/0180119 A1 | 8/2007 | Khivesara et al. | |
| 2007/0254679 A1 | 11/2007 | Montojo et al. | |
| 2007/0293222 A1 | 12/2007 | Vikberg et al. | |
| 2008/0045272 A1 | 2/2008 | Wang et al. | |
| 2008/0056148 A1 | 3/2008 | Wu | |
| 2008/0056183 A1 | 3/2008 | Gorokhov et al. | |
| 2008/0084844 A1 | 4/2008 | Reznik et al. | |
| 2008/0101270 A1 | 5/2008 | Kekki et al. | |
| 2008/0101280 A1 | 5/2008 | Gholmieh et al. | |
| 2008/0117891 A1 | 5/2008 | Damnjanovic et al. | |
| 2008/0165724 A1 | 7/2008 | Wu et al. | |
| 2008/0165755 A1 | 7/2008 | Marinier et al. | |
| 2008/0273610 A1 | 11/2008 | Malladi et al. | |
| 2009/0016275 A1 | 1/2009 | Liu et al. | |
| 2009/0028123 A1 | 1/2009 | Terry et al. | |
| 2009/0088185 A1 | 4/2009 | Beale | |
| 2009/0143072 A1 | 6/2009 | Montojo et al. | |
| 2009/0221293 A1 | 9/2009 | Petrovic et al. | |
| 2009/0268676 A1 | 10/2009 | Wigard et al. | |
| 2010/0034139 A1 | 2/2010 | Love et al. | |
| 2010/0091721 A1 | 4/2010 | Lamo et al. | |
| 2010/0208667 A1 | 8/2010 | Chun et al. | |
| 2011/0190001 A1 | 8/2011 | Patabandi et al. | |

FOREIGN PATENT DOCUMENTS

| | | |
|---|---|---|
| CN | 1613210 | 5/2005 |
| CN | 1735089 | 2/2006 |
| CN | 1805594 A | 7/2006 |
| CN | 1805596 | 7/2006 |
| EP | 1168759 | 1/2002 |
| EP | 1351538 | 10/2003 |
| EP | 1 432 261 | 6/2004 |
| EP | 1553798 | 7/2005 |
| EP | 1708524 A1 | 4/2006 |
| EP | 1 724 948 | 11/2006 |
| EP | 1720322 | 11/2006 |
| EP | 1 755 355 | 2/2007 |
| EP | 1 843 504 | 10/2007 |
| EP | 1 845 649 | 10/2007 |
| EP | 1 845 650 | 10/2007 |
| JP | 2001-078272 | 3/2001 |
| JP | 2002-527945 A | 8/2002 |
| JP | 2005-160079 | 6/2005 |
| JP | 2005-525065 | 8/2005 |
| JP | 2006-121282 | 5/2006 |
| JP | 2006-121394 | 5/2006 |
| JP | 2006-524444 | 10/2006 |
| JP | 2006-311411 A | 11/2006 |
| JP | 2006-524969 | 11/2006 |
| JP | 2006-352708 | 12/2006 |
| JP | 2009-535957 | 10/2009 |
| KR | 10-2002-0014939 | 2/2002 |
| KR | 10-2002-0061512 | 7/2002 |
| KR | 10-0365356 B1 | 12/2002 |
| KR | 10-2003-0049176 | 6/2003 |
| KR | 1020050073237 A | 7/2005 |
| KR | 20-0391476 A | 8/2005 |
| KR | 10-2005-0118591 | 12/2005 |
| KR | 1020060087355 A | 8/2006 |
| KR | 10-2006-0115175 | 11/2006 |
| KR | 10-2007-0000412 A | 1/2007 |
| RU | 2004-132193 | 4/2005 |
| RU | 2005-116242 A | 11/2005 |
| RU | 2004-126160 | 1/2006 |
| RU | 2428819 | 9/2011 |
| WO | WO 97/11566 | 3/1997 |
| WO | WO 98/24250 | 6/1998 |
| WO | WO0021253 | 4/2000 |
| WO | WO 02/093296 | 11/2002 |
| WO | WO 03/084095 A1 | 10/2003 |
| WO | WO 03/085874 | 10/2003 |
| WO | WO 03/096149 | 11/2003 |
| WO | WO 03/096567 | 11/2003 |
| WO | WO 2004/017541 A1 | 2/2004 |
| WO | WO 2004/042952 | 5/2004 |
| WO | WO 2005/015801 | 2/2005 |
| WO | WO 2005/048613 A1 | 5/2005 |
| WO | WO 2005/119941 | 12/2005 |
| WO | WO 2006/022876 | 3/2006 |

(56) References Cited

FOREIGN PATENT DOCUMENTS

| WO | WO2006083149 | 8/2006 |
|---|---|---|
| WO | WO 2006/105333 | 10/2006 |
| WO | WO 2006/118418 | 11/2006 |
| WO | 2007/002202 A2 | 1/2007 |
| WO | WO 2007/068304 | 6/2007 |
| WO | WO2007125428 | 11/2007 |

OTHER PUBLICATIONS

Ericsson: "E_UTRA Downlink Control Signaling—Open Issues", 3GPP TSG-RAN WG1, R!-061365, May 8, 2006, section 2.

Rapporteur (Motorola): "Report of E-Mail Discussion: DL Scheduling", 3GPP TSG-RAN WG1, R1-063684, Dec. 12, 2006, section 2, annex C.

LG Electronic: "Downlink control signaling", 3GPP TSG_RAN WG!, R1-063177, Nov. 6, 2006, sections 1-2.

Texas Instruments: "Control Channel Structure and Coding in E-UTRA Downlink", 3GPP TSG-RAN WG1, R1-063220, Nov. 6, 2006, sections 1-5.

Sharp: "UE Identity in L1/L2 Control Signaling for Downlink Scheduling Resource Allocation", 3GPP TSG-RAN WG2, R2-061129, May 8, 2006, sections 1-3.

Nokia: "ARQ Operation with HARQ-ARQ Interaction", 3GPP TSG-RAN WG2, R2-062765, Oct. 9, 2006, sections 2-3.

Ericsson: "Uplink HARQ-ARQ Interactions for NACK -> ACK Error", 3GP TSG-RAN WG2, R2-063238, Nov. 6, 2006, fig. 1, p. 2.

Samsung:"MAC functions: ARQ", 3GP TSG-RAN WG2, R2-060374, Feb. 13, 2006, section 2.

Herrmann, C. et al., "Improving Packet Loss Probability in the UMTS High-Speed Downlink", IEEE Vehicular Technology Conference, VTC Fall 2003, Oct. 6, 2003, pp. 2655-2659.

"Universal Mobile Telecommunications System (UMTS); User Equipment (UE) procedures in idle mode and procedures for cell reselection in connected mode (3GPP TS 25.304 version 7.1.0 Release 7); ETSI TS 125 304", ETSI Standards, Dec. 2006, XP014039981.

"Universal Mobile Telecommunications System (UMTS); High Speed Downlink Packet Access (HSDPA); Overall description; Stage 2 (3GPP TS 25.308 version 7.1.0 Release 7); ETSI TS 125 308", ETSI Standards, LIS, Dec. 2006, XP014039997.

3rd Generation Partnership Project: Technical Specification Group Radio Access Network, Physical Layers Aspects for Evolved UTRA (Release 7), 3GPP TR 25.814, v1.5.0, May 2006.

R2-061189: Further discussion on delay enhancements in Re17 3GPP Nokia, TSG-RAN WG2 Meeting #53, Shanghai, China, 8th-12th of May 2006.

3GPP Draft; R2-062440 Enhance_Cell_Fach_R2, 3rd Generation Partnership Project (3GPP), Mobile Competence Centre; XP050132021, Aug. 24, 2006.

Antti Toskala et al: "chapter 11 High-speed downlink packet access", WCDMA for UMTS; Radio Access for Third Generation Mobilecommunications, XP002458223, Jan. 1, 2002.

"Scheduling of System Information", R2-070220, 3rd Generation Partnership Project (3GPP), XP050133321, Jan. 12, 2007.

Nokia (Rapporteure): "System Information Classification", 3GPP Draft; R2-063077 SI Classification, 3rd Generation Partnership Project (3GPP), XP050132586, Nov. 1, 2006.

Qualcomm Europe: "Design and Performance of BCH for U-UTRA", 3GPP Draft; R1-062688, 3rd Generation Partnership Project (3GPP), XP050103177, Oct. 4, 2006.

"3rd Generation Partnership Project; Technical Specification Group Radio Access Network; Radio Link Control (RLC) protocol specification (Release 7)", 3GPP Standard; 3GPP TS 25.322, XP050367794, Sep. 1, 2006, pp. 1-80.

Pietro Nicoletti: "IEEE 802.11 frame format", XP055083596, Jun. 1, 2005.

Torres D: "Wireless Services R-Evolution: A Practical Overview of HSDPA", XP001504561, Jul. 1, 2005, pp. 161-167.

Ericsson: "Enhanced Cell_Fach", 3GPP Draft; R2-063209, 3rd Generation Partnership Project (3GPP), vol. RAN WG2, Nov. 1, 2006.

Siemens AG: "TDD: Measurement and Reporting Concept for 25.331", 3GPP Draft; R2-99B55, 3rd Generation Partnership Project (3GPP), XP050113684, Sep. 30, 1999.

Samsung: "DL control channel structure: overview", 3GPP Draf; R1-063272, 3rd Generation Partnership Project (3GPP), XP050103722, Nov. 1, 2006.

LG Electronics, "LTE System Information", TSG-RAN Working Group 2 #53, R2-061476, May 4, 2006.

3GPP TR 25.813 V7.1.0, 3rd Generation Partnership project; Technical Specification Group Radio Access Network Evolved Universal Terrestrial Radio Access (E-UTRA) and Evolved Universal Terrestrial Radio Access Network (E-UTRA) Radio interface protocol aspects (Release 7), Oct. 18, 2006.

Ericsson: "Semi persistent scheduling", 3GPP Draft; R2-062859, 3rd Generation Partnership Project (3GPP), XP050132382, Oct. 5, 2006.

* cited by examiner

FIG. 5

| D/C | PDU type | Set ID | SN | L | Oct 1 |
|---|---|---|---|---|---|
| SUFI$_1$ | | | | | Oct 2 |
| ... | | | | | |
| SUFI$_k$ | | | | | |
| PAD | | | | | Oct N |

METHOD OF TRANSMITTING AND RECEIVING STATUS REPORT IN A MOBILE COMMUNICATION SYSTEM

This application claims priority to PCT/KR2007/006360 filed on Dec. 7, 2007, U.S. Provisional Application No. 60/869,073 filed Dec. 7, 2006, and Korean Patent Application No. 10-2007-0003282 filed on Jan. 11, 2007, all of which are hereby incorporated by reference in their entirety.

TECHNICAL FIELD

The present invention relates to a method of transmitting and receiving a status report in a mobile communication system and a transmitter for the same.

BACKGROUND ART

FIG. 1 illustrates a network structure of a universal mobile telecommunications system (UMTS).

The UMTS includes a user equipment (UE), a UMTS terrestrial radio access network (UTRAN), and a core network (CN). The UTRAN includes at least one radio network sub-systems (RNS), wherein each RNS includes a radio network controller (RNC) and at least one base station (Node B) managed by the RNC. At least one cell exists in one Node B.

A radio protocol used in the UMTS includes a plurality of layers, and a radio link control (RLC) of the layers serves to ensure quality of service (QoS) of each radio bearer (RB) and transmit data thereof. The RLC layer provides one or two independent RLC entities for each RB to ensure unique QoS of each RB, and also provides three RLC modes, i.e., a transparent mode (TM), an unacknowledged mode (UM), and an acknowledged mode (AM) to support various kinds of QoS.

The AM RLC is to ensure error-free data transmission through re-transmission. Accordingly, the AM RLC serves to mainly transmit unreal time packet data of a packet switching domain, such as TCP/IP, in a user plane. Also, in a control plane, the AM RLC serves to transmit RRC message which necessarily requires acknowledgement, among RRC messages transmitted to a specific user equipment within a cell.

A protocol data unit (PDU) used in the AM RLC can be divided into a data PDU and a control PDU. The control PDU can be subdivided into a status PDU, piggybacked status PDU, a reset PDU, and a reset Ack PDU.

Meanwhile, a media access channel (MAC) entity provided in a MAC layer determines how many data are transmitted by which RLC entity per transmission time interval (TTI). Each RLC entity configures RLC PDUs depending on the determined result of the MAC entity and forwards the RLC PDUs to the MAC entity.

In view of the RLC entity, if a lower entity is operated desirably, status information which will be exchanged between the respective RLC entities has an insignificant amount. For example, if a user equipment is located close to a base station, it is not likely that the RLC PDU forwarded to a lower end by the RNC entity fails to reach the other RLC entity as the RLC PDU is not transmitted well from the lower end. Accordingly, it is not likely that the RLC entity at a receiving side transmits status information to the RLC entity a transmitting side, wherein the status information is to request retransmission of a corresponding RLC PDU as the RLC entity at the receiving side fails to receive the RLC PDU.

However, in a mobile communication system, a user equipment changes its position continuously, and a communication environment may be changed rapidly even though the user equipment does not move. Also, if the user equipment is located at the boundary of one or more cells, or if the user equipment suddenly enters a tunnel, it is likely that data blocks transmitted from the user equipment and data blocks transmitted from the base station to the user equipment may be damaged in a radio interval. In this case, control information to be exchanged between the base station and the user equipment, i.e., status information increases. An example of the status information includes reception status information of data, i.e., predetermined status report, which is to report information as to whether each data block has been successfully received.

Meanwhile, in a status where a wireless environment is poor, the amount of data which the user equipment can transmit per transmission time interval (TTI) is limited. Accordingly, since the status report that can be transmitted from the RLC entity of the receiving side is limited to a certain size, the RLC entity of the receiving side should divide the status report into a plurality of status PDUs and transmit the divided status PDUs to the transmitting side. At this time, some of the divided status PDUs may not reach the RLC entity of the transmitting side for several reasons. As a result, the RLC entity of the transmitting side may wrongfully determine data reception status of the RLC entity of the receiving side.

For example, when one status report is divided into two status PDUs, it is supposed that the first status PDU reports that first to fifth RLC PDUs and seventh to tenth RLC PDUs have been successfully received and that the second status PDU reports that eleventh to fifteenth RLC PDUs have been successfully received.

If the RLC entity of the transmitting side successfully receives the second status PDU only, the RLC entity of the transmitting side may wrongfully determine that the RLC entity of the receiving side has successfully received the first to fifteenth RLC PDUs. Also, the RLC entity of the transmitting side may wrongfully determine that the RLC entity of the receiving side has not successfully received the first to tenth RLC PDUs. Moreover, if the RLC entity of the transmitting side receives the first status PDU after receiving the second status PDU, the RLC entity of the transmitting side may determine that among RLC PDUs generated after the fifteenth RLC PDU, the sixth RLC PDU has not been successfully forwarded. All the above problems may be caused as the large sized status report has not been successfully forwarded to the RLC entity of the transmitting side.

DISCLOSURE OF THE INVENTION

Accordingly, the present invention is directed to a method of transmitting and receiving a status report in a mobile communication system and a transmitter for the same, which substantially obviates one or more problems due to limitations and disadvantages of the related art.

An object of the present invention is to provide a method of transmitting and receiving a status report in a mobile communication system and a transmitter for the same, in which reliable transmission of status information can be performed.

Another object of the present invention is to provide a method of transmitting and receiving a status report in a mobile communication system and a transmitter for the same, in which transmission efficiency of status information can be maximized in the mobile communication system.

In a method of transmitting a status report in a mobile communication system in accordance with one embodiment of the present invention, a receiving side transmits a status report to a transmitting side to report reception status information of a plurality of data blocks received from the transmitting side. In other words, if a predetermined event occurs, the transmitting side triggers transmission of a status report. If the size of a status data block which includes reception status information of a plurality of data blocks exceeds a maximum allowable value which is previously set, the receiving side configures the one status report by using at least two status data blocks and transmits the at least two status data blocks to the transmitting side. Each status data block includes reception status information of a part of the plurality of data blocks and indication information indicating that the corresponding data blocks belong to the status report. The transmitting side receives at least two status data blocks, which include reception status information of the plurality of data blocks and indication information indicating that the data blocks belong to the status report, from the receiving side. The transmitting side acquires reception status information of the plurality of data blocks from the at least two status data blocks by using the indication information.

BRIEF DESCRIPTION OF THE DRAWINGS

FIG. 5 illustrates an example of a data format of each status PDU if one status report includes two or more status PDUs in accordance with the preferred embodiment of the present invention;

BEST MODE FOR CARRYING OUT THE INVENTION

Hereinafter, structures, operations, and other features of the present invention will be understood readily by the preferred embodiments of the present invention, examples of which are illustrated in the accompanying drawings.

The present invention can be applied to a downlink or uplink of various kinds of communication systems. The downlink means communication from a base station (BS) to a mobile station (MS), and the uplink means communication from a user equipment to a base station. The base station generally means a fixed station which communicates with a user equipment, and may be referred to as other terminologies such as node-B, base transceiver system (BTS), and access point. The user equipment may be fixed or have mobility, and may be referred to as other terminologies such as user terminal (UT), subscriber station (SS), and wireless device.

Also, one embodiment of the present invention can be operated in UMTS. Hereinafter, an operation background of the embodiments of the present invention will be described and then operation procedures according to the embodiments of the present invention will be described in detail.

Figure 1:
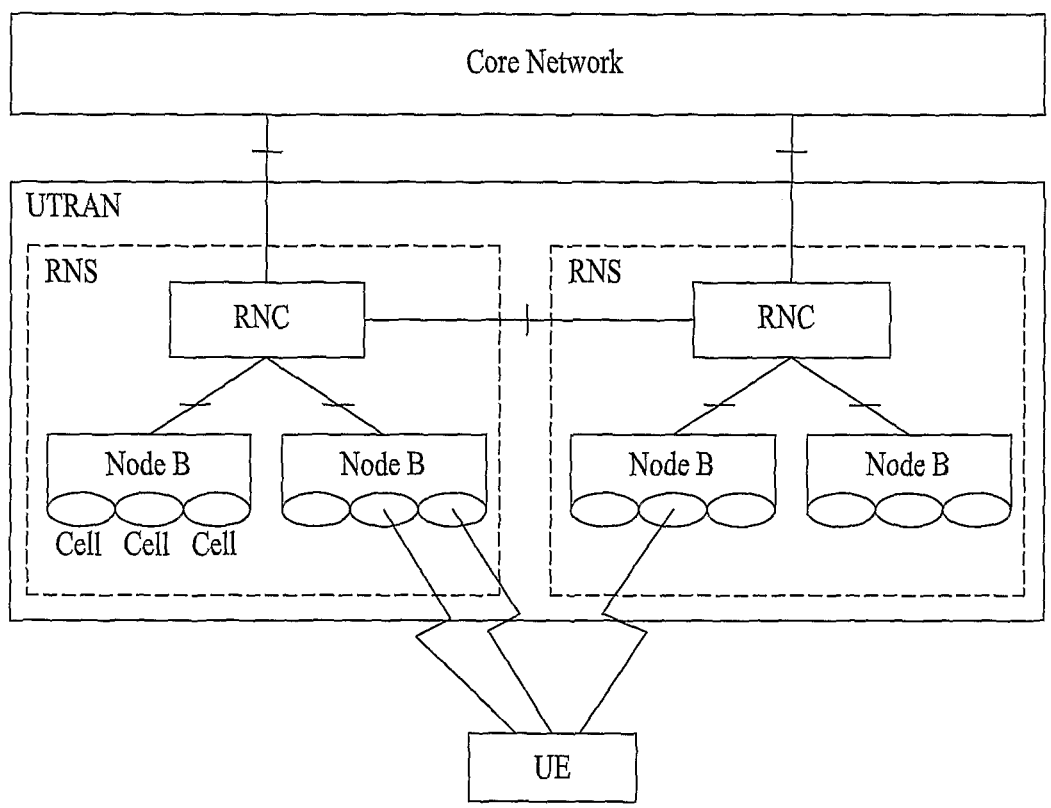
FIG. 1 illustrates a network structure of a UMTS (Universal Mobile Telecommunications System)
Figure 2:
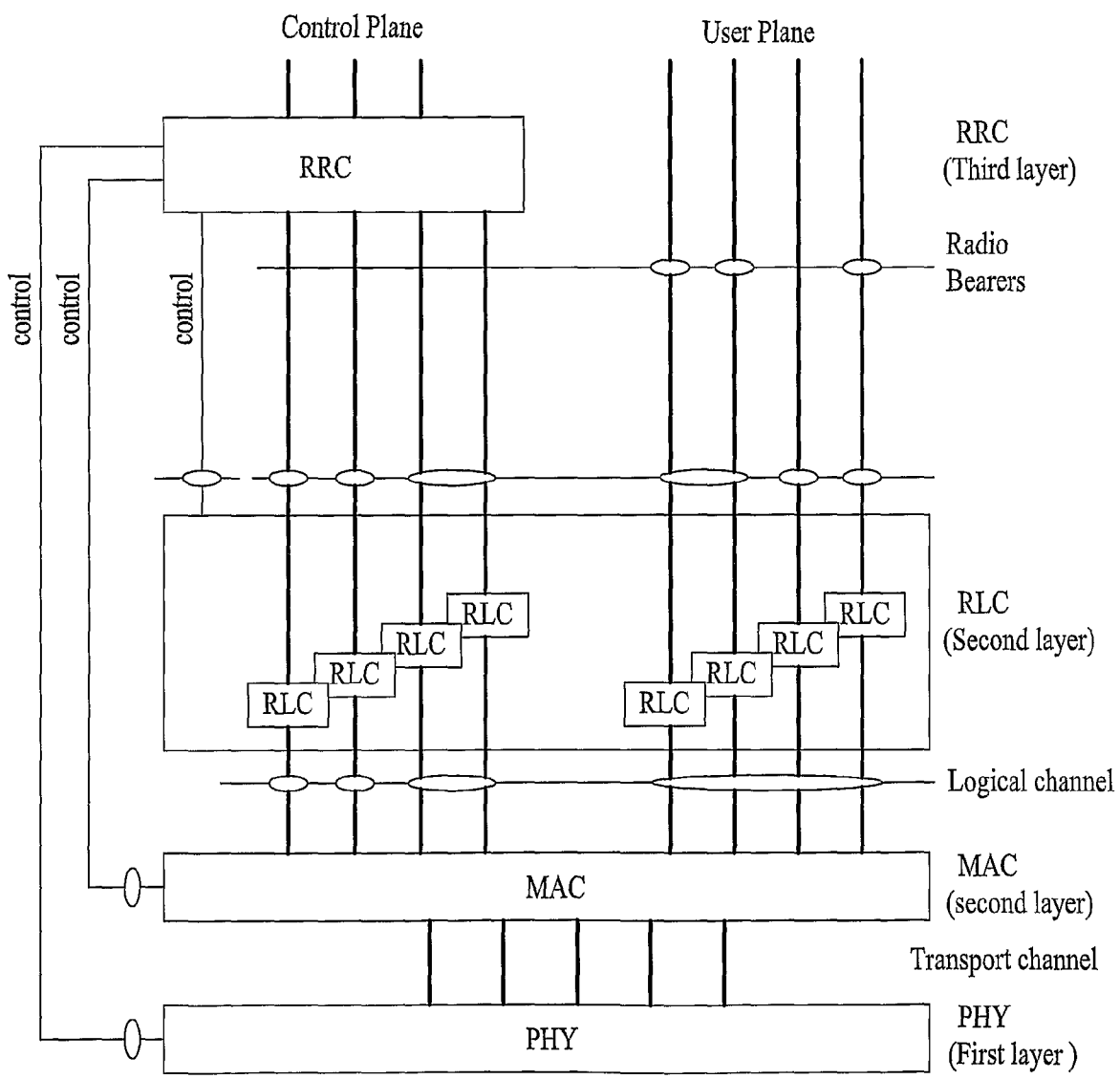
FIG. 2 is a block diagram illustrating a structure of a radio protocol used in UMTS.

FIG. 2 is a block diagram illustrating a structure of a radio protocol used in the UMTS. Radio protocol layers as shown exist in pairs in the user equipment and the UTRAN, and are in charge of data transmission of a radio interval.

A physical (PHY) layer which is a first layer serves to transmit data to a radio interval by using various radio transmission techniques, and a reliable data PHY layer of the radio interval is connected with a medium access control (MAC) layer through a transport channel, wherein the MAC layer is an upper layer of the PHY layer.

MAC, RLC, PDCP, and BMC (Broadcast/Multicast Control) layers exist in a second layer.

The MAC layer serves to map various logical channels with various transport channels, and also serves to perform logical channel multiplexing which maps several logical channels with one transport channel. The MAC layer is connected with the RLC layer through a logical channel, wherein the RLC layer is an upper layer of the MAC layer. The logical channel is divided into a control channel and a traffic channel depending on types of transmitted information, wherein the control channel transmits information of a control plane and the traffic channel transmits information of a user plane.

The RLC layer serves to ensure QoS for each radio bearer (RB) and transmit data thereof. The RLC layer will be described in detail later.

The BMC layer exists above the RLC layer, schedules a cell broadcast message, and broadcasts the cell broadcast message to user equipments located in a specific cell. The PDCP layer is located above the RLC layer, and allows data to be efficiently transmitted in a radio interval having a relatively small bandwidth by using IP packet such as IPv4 or IPv6.

A radio resource control (RRC) layer located in a third layer is defined in a control plane only, serves to control parameters of the first and second layers in respect of setup, re-setup and release of the RBs, and also to control logical channels, transport channels and physical channels.

Hereinafter, the RLC layer which is closely related to the embodiments of the present invention will be described.

A basic function of the RLC layer is to ensure QoS of each RB and transmit data thereof. Since the RB service is a service provided to an upper layer by the second layer of the radio protocol, QoS is affected by the entire of the second layer. Especially, QoS is greatly affected by the RLC layer. The RLC layer provides an independent RLC entity for each RB to ensure unique QoS of RB, and also provides three RLC modes, i.e., a transparent mode (TM), an unacknowledged mode (UM), and an acknowledged mode (AM) to support various kinds of QoS. Since the three RLC modes respectively support different kinds of QoS, they are different from one another in their operation method and their detailed function. Accordingly, the RLC layer should be considered depending on its operation mode.

The TM RLC is a mode which does not add any overhead to RLC service data unit (SDU) transmitted from its upper level in constituting RLC PDU. In other words, the TM RLC is referred to in that the RLC passes through SDU in a transparent mode. The TM RLC serves to perform the following functions in the user plane and the control plane owing to its characteristic as aforementioned.

In the user plane, since a data processing time is short within the RLC, the TM RLC serves to transmit real time circuit data such as voice or streaming of a circuit service domain (CS domain). Also, in the control plane, since there is no overhead within the RLC, the TM RLC serves to transmit RRC message from an unspecified user equipment in case of an uplink, and serves to transmit RRC message broadcasted to all user equipments within a cell in case of a downlink.

Unlike the transparent mode, a mode in which overhead is added to the RLC SDU will be referred to as a non-transparent mode. The non-transparent mode includes the unacknowledged mode (UM) having no acknowledgement for data transmission and the acknowledged mode (AM) having acknowledgement for data transmission.

The UM RLC transmits PDUs by adding a PDU header, which includes a sequence number (SN), to each PDU, so that a receiving aide can identify which PDU has been lost during transmission. In accordance with this function, in the user plane, the UM RLC serves to transmit broadcast/multicast data or transmit real time packet data such as voice (e.g., VoIP) or streaming of a packet service domain (PS domain). Also, in the control plane, the UM RLC serves to transmit RRC message which does not require acknowledgement, among RRC messages transmitted to a specific user equipment or a specific user equipment group within a cell.

Like the UM RLC, the AM RLC configures PDUs by adding a PDU header including SN thereto. However, the AM RLC is different from the UM RLC in that the receiving side acknowledges the transmitted PDUs. The reason why the receiving side acknowledges the transmitted PDUs in the AM RLC is to request a transmitting side to re-transmit PDU which the receiving side has not received. Accordingly, the AM RLC is to ensure error-free data transmission through re-transmission. For this reason, the AM RLC serves to transmit unreal time packet data such as TCP/IP of the PS domain in the user plane. Also, in the control plane, the AM RLC serves to transmit RRC message which necessarily requires acknowledgement, among RRC messages transmitted to a specific user equipment within a cell.

In view of a directional aspect, the TM RLC and the UM RLC are used for uni-directional communication whereas the AM RLC is used for bi-directional communication due to a predetermined feedback from the receiving side. Since such bi-directional communication is mainly used in point-to-point communication, the AM RLC uses a dedicated logical channel only.

In view of a structural aspect, in the TM RLC and the UM RLC, one RLC entity only corresponds to either the transmitting side or the receiving side. On the other hand, in the AM RLC, both the transmitting side and the receiving side exist in one RLC entity. Meanwhile, the AM RLC includes a re-transmission buffer for managing retransmission in addition to a transmission and reception buffer, and uses a transmission and reception window for flow control.

The transmitting side of the AM RLC requests a receiving side of a peer RLC entity through polling to provide status information, and the receiving side of the AM RLC transmits a status report to a transmitting side of the peer RLC entity to report its data status. The status report is transmitted in a type of status PDU, and status PDU is transmitted into a data PDU by piggyback to enhance efficiency of data transmission.

In addition, there are provided a reset PDU and a reset ACK PDU. The reset PDU allows an AM RLC entity to request the other AM RLC entity to reset all operations and parameters when a significant error is found during an operation procedure. The reset ACK PDU is used for acknowledgement of the reset PDU. To support the above functions, the AM RLC needs several protocol parameters, status parameters, and timer. Like the aforementioned status PDU, piggyback status PDU, reset PDU, and reset ACK PDU, PDUs used to control data transmission in the AM RLC will be referred to as control PDUs, and PDUs used to transfer user data will be referred to as data PDUs.

A structure of a status PDU of the control PDU will be described in detail with reference to FIG. 3.

A D/C field 31 identifies whether a corresponding PDU is a data PDU or a control PDU. A PDU type field 32 specifies whether a corresponding PDU is a status PDU, a piggyback status PDU, a reset PDU, or a reset ACK PDU. The status PDU includes a plurality of super fields (SUFIs) 33-1, . . . , 33-k. The SUFI indicates information as to which AM RLC PDU has been arrived in the receiving side and which AM RLC PDU has not been arrived in the receiving side, or indicates that the transmitting side will not transmit data any more as it has deleted some RLC SDU. The SUFI is divided into three parts of type, length, and value. The size of the status PDU is variable but is limited to the size of the greatest RLC PDU of a logical channel to which the status PDU is transmitted.

Figure 4:
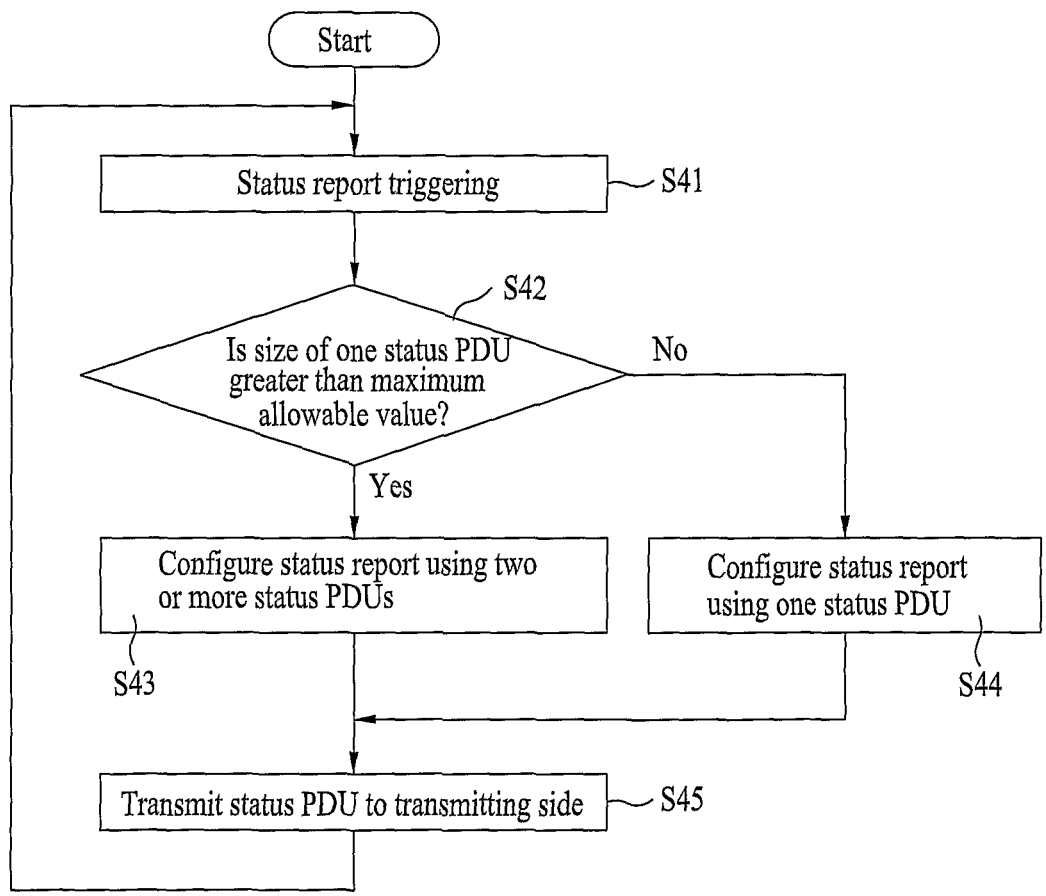
FIG. 4 is a flow chart illustrating a method of transmitting a status report in accordance with one embodiment of the present invention.

FIG. 4 is a flow chart illustrating a method of transmitting a status report in accordance with one embodiment of the present invention. FIG. 4 illustrates that the RLC layer of the receiving side transmits reception status information of a plurality of data blocks, i.e., a plurality of RLC PDUs, which are transmitted from the transmitting side, to the transmitting side. The reception status information is information as to whether each RLC PDU transmitted from the transmitting side has been successfully transmitted to the receiving side. Hereinafter, it is to be understood that the terminology, 'transmitting side' has been used in view of transmitting a plurality of RLC PDUs while the terminology, 'receiving side' has been used in view of receiving a plurality of RLC PDUs transmitted to the transmitting side.

Referring to FIG. 4, a predetermined event occurs, the RLC layer of the receiving side triggers transmission of one status report [S41]. For example, if it is commanded from the transmitting side to perform status report through polling, or if it is commanded to transmit the status report from the upper layer to the transmitting side, the RLC layer of the receiving side triggers transmission of a status report. In addition, other examples may be used as a predetermined event for triggering transmission of the status report.

If status report is triggered, based on RLC reception buffer status of the receiving side, it is determined whether the size of reception status information to be transmitted to the transmitting side is greater than a maximum allowable value which is previously set, wherein the reception status information is included in one status PDU [S42]. The maximum allowable value can be determined by the MAC layer of the receiving side and then reported to the RLC layer. The MAC layer can variably determine the maximum allowable value considering the channel status between the transmitting side and the receiving side. For example, if the channel status is good, the maximum allowable value is set at a great value so that the size of one status PDU that can be generated by the RLC layer becomes great relatively. If the channel status is not good, the maximum allowable value is set at a small value so that the size of one status PDU becomes small relatively. The maximum allowable value can be set by being instructed from the upper layer or the transmitting side.

When the reception status information to be transmitted to the transmitting side is included in one status PDU, if its size is greater than the maximum allowable value which is previously set, the RLC layer of the receiving side configures one status report to be transmitted to the transmitting side by using two or more status PDUs [S43]. In other words, the reception status information to be transmitted to the transmitting side is divided into two or more parts to configure two or more status PDUs which respectively include two or more parts, whereby the size of each status PDU becomes smaller than the maximum allowable value. When the reception status information to be transmitted to the transmitting side is included in one status PDU, if its size is smaller than the maximum allowable value which is previously set, the RLC layer of the receiving side configures one status report to be transmitted to the transmitting side by using one status PDU [S44]. Each status PDU generated in step S43 or S44 is transmitted to the transmitting side [S45].

FIG. 5 illustrates an example of a data format of each status PDU if two or more status PDUs configure one status report in accordance with the preferred embodiment of the present invention.

Figure 3:
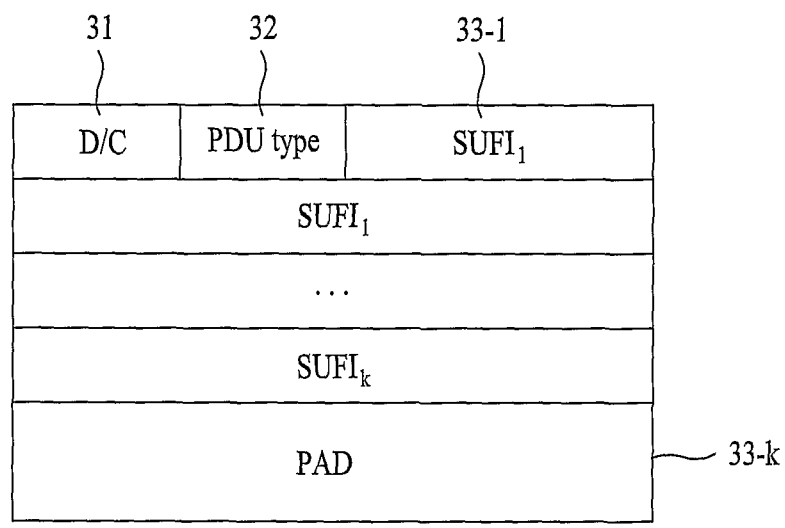
FIG. 3 illustrates a structure of a status PDU of a control PDU.

As compared with the general status PDU of FIG. 3, it is noted that the status PDU of FIG. 5 further includes a 'set ID' field, an 'SN' field, and an 'L' field. In FIG. 5, a 'PDU type' field includes identification information for identifying a corresponding status PDU from other kinds of control PDUs. Also, the 'PDU type' field may include information for identifying each status PDU corresponding to the case where a plurality of status PDUs configure one status report from a status PDU corresponding to the case where one status PDU configures one status report. In other words, a status PDU corresponding to the case where one status report is configured by means of one status PDU is identified differently from a status PDU corresponding to the case where one status report is configured by means of a plurality of status PDUs.

The 'set ID' field includes identification information for identifying a corresponding status report from other status report. If one status report is configured by means of two or more status PDUs, the 'set ID' field of each status PDU includes same identification information to indicate that a corresponding status PDU belong to the same status report. For example, when the RLC layer of the receiving side transmits a plurality of status reports to the transmitting side, a sequence number is given to each status report depending on the transmission order and a corresponding sequence number is included in the 'set ID' field of the status PDU included in each status report. At this time, if one status report is configured by means of a plurality of status PDUs, the same sequence number is included in the 'set ID' field of each status PDU.

The 'SN' field includes a sequence number of a corresponding status PDU. For example, if three status PDUs configure one status report, the 'SN' field of each status PDU includes sequence numbers of 0, 1 and 2. The 'L' field includes information which indicates whether a corresponding status PDU is the last status PDU belonging to one status report. In the example of constituting one status report by means of the three status PDUs, the field of the first and second status PDUs includes information which indicates that a corresponding status PDU is not the last status PDU belonging to one status report while the 'L' field of the third status PDU includes information which indicates that a corresponding status PDU is the last status PDU belonging to one status report.

If the RLC layer of the transmitting side receives a plurality of status PDUs included in one status report, it can identify, through information included in the 'set ID' field of each status PDU, that a corresponding status PDU belongs to one status report, and can determine, through information included in the 'SN' field and the 'L' field, whether all status PDUs belonging to the one status report have been received. Accordingly, the RLC layer of the transmitting side can exactly acquire reception status information transmitted from the RLC layer of the receiving side.

Figure 6:
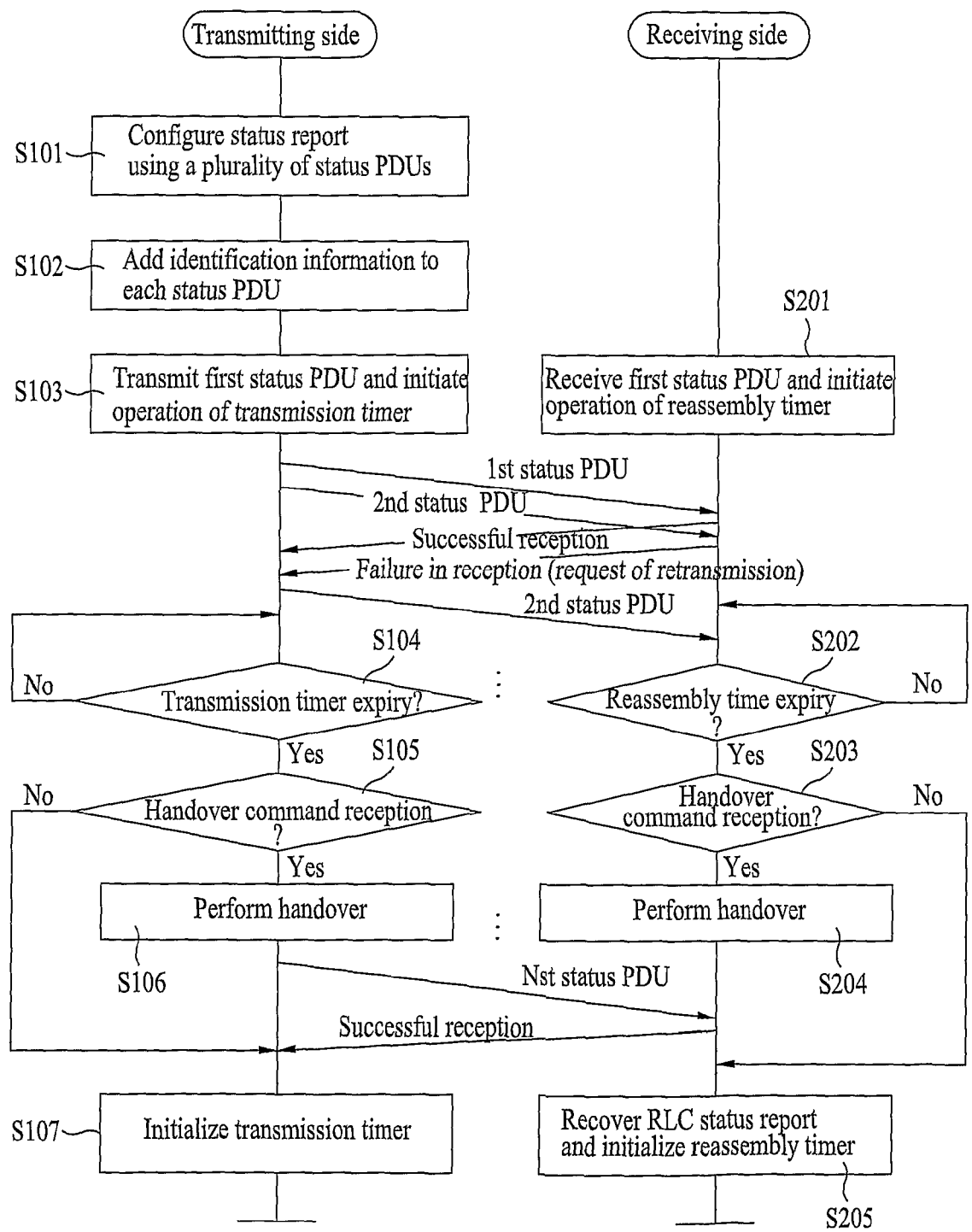
FIG. 6 is a flow chart illustrating a method of transmitting a status report in accordance with another embodiment of the present invention.

FIG. 6 is a flow chart illustrating a method of transmitting a status report in accordance with another embodiment of the present invention. Hereinafter, unlike the embodiments of FIG. 4 and FIG. 5, the 'transmitting side' will be used in view of transmitting the status PDUs while the 'receiving side' will be used in view of receiving the status PDUs.

Addition of Identification Information to Divided RLC Status Report

When a predetermined event for triggering status report occurs, if the size of reception status information to be transmitted to the receiving side exceeds an allowable threshold value which is previously set, the RLC layer of the transmitting side configures one status report by means of two or more status PDUs (S101). The RLC layer of the transmitting side adds identification information to each status PDU (S102).

The identification information includes at least one of status PDU set identifier for identifying a corresponding RLC status report from other RLC status report, a sequence number of a corresponding status PDU, and a final status PDU indicator for indicating that the corresponding status PDU is the last status PDU belonging to the status report. The identification information may be attached to SUFI (Super Field) 33-1, . . . , 33-$k$ in the structure of the status PDU shown in FIG. 3, or may be added to a separate new field.

Specifically, if one status report is configured by means of several status PDUs, each status PDU belonging to one status report may include a status PDU set identifier set to the same value. Accordingly, the transmitting side sets a status PDU set identifier of a status PDU related to the RLC status report to the same value while the receiving side which receives the status report processes the received status PDUs by grouping status PDUs having the same status PDU set identifier for the received status PDUs. In other words, the receiving side recovers the status report by combining status PDUs having status PDU set identifiers set to the same value.

Furthermore, each status PDU may include a sequence number to determine the processing order of status PDUs having the same status PDU set identifier, or the order of information. In other words, if one status report is configured by means of a plurality of status PDUs, the sequence number is used to indicate information of the generating order or the configuration order of each status PDU. Accordingly, even though status PDUs belonging to one status report are forwarded to the receiving side in the order changed during transmission, the receiving side can realign the respective status PDUs by using the sequence number and combine them to recover the original status report.

Furthermore, the RLC entity which receives the status report needs information as to how many status PDUs configure the status report. If there is no such information, the RLC entity which receives the status report cannot identify whether all status PDUs belonging to one RLC status report have been received. Accordingly, if one status report is configured by a plurality of status PDUs, information, as to how many status PDUs have been divided or which status PDU is the last part of the status report, is needed.

To indicate the last status PDU belonging to one status report, each status PDU can include a final status PDU indicator. Accordingly, it is preferable that the RLC entity of the transmitting side sets the last unit for the final status PDU indicator of the last status PDU but does not set (clears) the final status PDU indicator for the other status PDUs.

The RLC entity of the receiving side checks the final status PDU indicator for the received status PDU and then regards the status PDU in which the final status PDU indicator is set as the last part of the corresponding RLC status report. At this time, if all status PDUs belonging to the corresponding status report are received, the receiving side realigns the received status PDUs and combines them to configure one status report.

Report of Received Result and Retransmission

The receiving side can report the reception result of each status PDU constituting one RLC status report to the transmitting side. In this case, whether a specific status PDU has been successfully received or has been failed in reception is reported to the transmitting side. Failure in reception may mean both the case where the specific status PDU has been received but has not been received normally and the case where the specific status PDU has not been received. Alternatively, failure in reception may separately mean the above cases.

Furthermore, successful reception means the case where the RLC status report has been successfully recovered by using received status PDUs or the case where all status PDUs corresponding to one RLC status report have been normally received. Meanwhile, the receiving side can request the transmitting side to retransmit status PDUs which have been failed in reception or have not been received normally.

The transmitting side retransmits corresponding status PDUs if retransmission is requested from the receiving side. However, since communication efficiency is deteriorated if retransmission of the same status PDU is performed without limitation, the retransmission can be limited to the range less than the number of times, which is previously set. Accordingly, if information as to that retransmission of specific status PDUs has been performed in the range more than the designated number of times but some status PDUs have not been received normally is received from the receiving side, the transmitting side does not transmit the status PDUs any longer.

Limitation of Handover in Transmitting Side

The transmitting side first transmits one of status PDUs constituting one status report and at the same time drives an RLC status transmission timer for a corresponding RLC status report (S103). In a state that the transmitting side is a user equipment and has received a handover command, since desirable communication cannot be performed if handover is not performed within a certain time, the transmitting side is requested to completely transmit the status report within the certain time.

If the transmitting side is reported from the receiving side that all status PDUs belonging to a specific status report have been successfully received, the transmitting side disconnects a first region (cell or sector) which has transmitted the handover command, and starts to newly connect a second region. In this case, a base station (receiving side) of the first region forwards RLC SDUs which have not been received in the user equipment and RLC SDUs which have never been transmitted to the user equipment to a base station of the second region based on the received status report.

However, since handover is still required to maintain desirable communication even though transmission of the status report is not completed in the current region, if the transmission tinier reaches a previously set time (S104) even though the transmitting side is not reported that all status PDUs of a specific status report have been successfully received, the transmitting side disconnects the first region (cell or sector) which has received the handover command (S105), and starts to newly connect the second region (S106). In this case, the base station (receiving side) of the first region forwards RLC SDUs, which have not been received normally or have not been received in the user equipment, to the base station of the second region based on the received status report.

Limitation of Handover in Receiving Side

The receiving side cannot wait for all status PDUs belonging to the status report indefinitely until all status PDUs are arrived therein. Accordingly, the receiving side first receives any one of status PDUs constituting one status report from the transmitting side and at the same time drives an RLC status reassembly timer for a corresponding RLC status report (S201).

The receiving side transmits information of successful reception/failure in reception of each status PDU to the transmitting side provided that the reassembly timer is being driven. If the receiving side normally receives all status PDUs corresponding to one status report before the reassembly timer reaches a previously set time, the receiving side stops the reassembly timer and recovers the corresponding status report to the original status (S205). However, it the reassembly timer reaches a previously set time before the receiving side normally receives all status PDUs corresponding to one status report, the receiving side recovers the corresponding status report based on the status PDUs which have been received until now.

Meanwhile, in a state that the receiving side is a base station and has commanded the user equipment, i.e., the transmitting side, to perform handover, since desirable communication cannot be performed if the user equipment does not perform handover within a certain time, the user equipment is also requested to completely transmit the status report within the certain time.

If the base station successfully receives all status PDUs corresponding to one status report before the reassembly timer ends, the base station releases connection with the user equipment and performs handover. In this case, the base station forwards RLC SDUs which have not been received in the user equipment and RLC SDUs which have never been transmitted to the user equipment to a base station of a new region based on the received status report.

Even though the receiving side has not successfully received all status PDUs corresponding to one status report, if the reassembly timer ends (S202) and handover is requested (S203), handover is performed likewise (S204). At this time, the base station forwards RLC SDUs, which have not been received normally or have not been received in the user equipment, to a base station of the new region (second region) based on the received status report, whereby transmission is performed in the second region.

Figure 7:
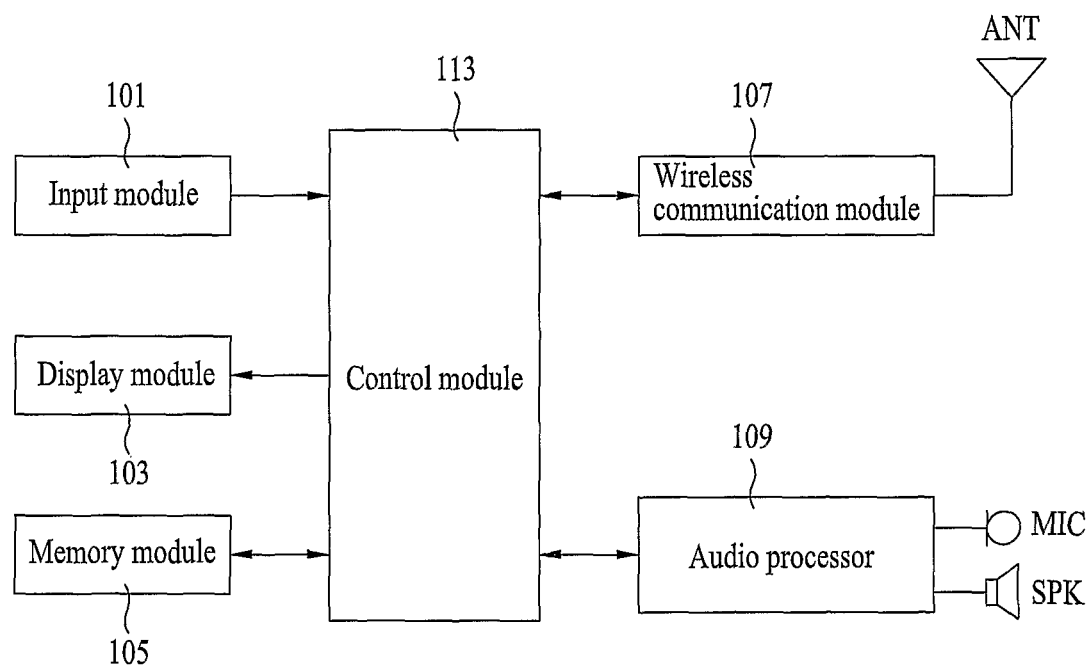
FIG. 7 illustrates a main configuration of a user equipment supposing that a transmitting side of RLC status report is the user equipment.

FIG. 7 illustrates a main configuration of a user equipment supposing that a transmitting side of the status report is the user equipment. This is only exemplary, and the user equipment could be a receiving side of the status report.

The user equipment 100 includes an input module 101 for selecting a desired function or inputting information, a display module 103 displaying various kinds of information for operating the user equipment 100, a memory module 105 for storing various programs required to operate the user equipment 100 or data to be transmitted to a receiving side, a wireless communication module 107 for receiving an external signal and transmitting data to the receiving side, an audio processor 109 for converting a digital audio signal into an analog audio signal, amplifying the converted audio signal, and outputting the amplified signal to a speaker (SP) or amplifying an audio signal from a mike (MIC) and converting the amplified audio signal into a digital audio signal, and a control module 111 for controlling entire driving of the user equipment 100.

In this case, the control module 111 configures a status report of a predetermined size or greater by using two or more RLC status PDUs, and further includes a function for adding identification information to each of the status PDUs. Also, the wireless communication module 107 transmits the status PDUs to the transmitting side.

The user equipment 100 may further include a transmission timer (not shown) to which a first data unit of the status report is transmitted and which initiates driving. In this case, if a previously set time of the transmission timer passes in a state that handover is requested, the control module 111 performs handover regardless of the fact that normal reception of all data units of the status report has been reported from the transmitting side.

Supposing that the receiving side of the RLC status report is a base station (not shown), the base station includes a memory module (not shown) for storing various programs required to operate the base station or data to be transmitted to the transmitting side, a wireless communication module (not shown) for receiving an external signal and transmitting data to the transmitting side, and a control module (not shown) for controlling entire driving of the base station.

The wireless communication module receives two or more status PDUs constituting a status report of a predetermined size or greater. Also, the control module recovers the status report by using identification information included in the received status PDUs.

The receiving side may further include a reassembly timer which receives the first status PDU of the status report and initiates driving. In this case, the control module performs handover regardless of the fact that the receiving side has successfully received all data units of the status report if a previously set time of the reassembly timer passes in a state that a handover command is given to the receiving side.

Meanwhile, in the present invention, the RLC entity of the transmitting side may configure a specific status report by using a plurality of status PDUs in such a manner that each status PDU can be construed separately or cannot be construed separately.

If each status PDU can be construed separately, each status PDU constituting one status report can be construed independently even without other status PDUs. In other words, the RLC entity of the receiving side can process partial control information included in each status PDU even though it does not receive all status PDUs corresponding to one RLC status report.

If each status PDU cannot be construed separately, each status constituting one status report cannot be construed independently without other status PDUs. In other words, the RLC entity of the receiving side can neither recover nor use control information included in each status PDU if it does not receive all status PDUs corresponding to one status report.

According to the present invention, it is possible to stably transmit a status report of a large size between the transmitting side and the receiving side of the RLC entity of the response mode through identification information included in divided messages. Also, proper matching between reliable status information transmission and desirable handover can be obtained through the timer provided in the transmitting side and/or the receiving side.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to configure the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to configure the embodiment or add new claims by means of amendment after the application is filed.

The embodiments of the present invention have been described based on data transmission and reception between the transmitting side and the receiving side. If the transmitting side or the receiving side is a network herein, a specific operation which has been described herein as being performed by the transmitting side or the receiving side may be performed by the base station or its upper node as the case may be. In other words, it will be apparent that various operations performed for communication with the user equipment in the network which includes a plurality of network nodes along with the base station may be performed by the base station or network nodes other than the base station. The base station may be replaced with terms such as a fixed station, Node B, eNode B (eNB), and access point. Also, the user equipment may be replaced with terms such as mobile station (MS) and mobile subscriber station (MSS).

The embodiments according to the present invention may be implemented by various means, for example, hardware, firmware, software, or their combination. If the embodiment according to the present invention is implemented by hardware, the random access method in the mobile communication system according to the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the random access method in the mobile communication system according to the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention is applicable to a wireless communication system such as a mobile communication system and a wireless internet system.

The invention claimed is:

1. A method of transmitting a status report at a transmitting side in a mobile communication system, the method comprising:
configuring a status report using a plurality of status protocol data units (PDUs), each of the status PDUs including reception status information of received data PDUs and indication information including an identifier for identifying the status report;
transmitting the status report to a first cell or sector;

starting a status transmission timer related to the status report at the same time with transmission of a first status PDU of the plurality of status PDUs;

receiving a handover command from the first cell or sector; and performing a handover regardless of whether each reception result for all the plurality of status PDUs is reported if the status transmission timer expires.

2. The method of claim 1, wherein each status PDU includes a sequence number.

3. The method of claim 2, wherein each status PDU includes a field for indicating whether a corresponding status PDU is the last status PDU belonging to the status report or each status PDU includes an indicator for indicating the number of the status PDUs used for the status report.

4. The method of claim 1, further comprising:

starting connection to a second cell or sector after disconnecting the first cell or sector.

5. A method of receiving a status report at a first receiving side in a mobile communication system, the method comprising:

receiving a status report, wherein the status report is configured by a plurality of status protocol data units (PDUs), each of the status PDUs including reception status information of received data PDUs and indication information including an identifier for identifying the status report;

starting a status reassembly timer related to the status report at the same time with reception of a first status PDU of the plurality of status PDUs;

transmitting a handover command to a transmitting side; and performing a handover regardless of whether all of the plurality of status PDUs are reported if the status reassembly timer expires.

6. The method of claim 5, wherein each status PDU includes a sequence number.

7. The method of claim 6, wherein each status PDU includes a field for indicating whether a corresponding status PDU is the last status PDU belonging to the status report or each status PDU includes an indicator for indicating the number of the status PDUs used for the status report.

8. The method of claim 5, further comprising:

transmitting a plurality of service data units (SDUs), which are not successfully received or are not received by the transmitting side based upon the status report, to a second receiving side.

9. An apparatus for receiving a status report in a mobile communication system, the apparatus comprising:

a wireless communication module configured to receive a status report, wherein the status report is configured by a plurality of status protocol data units (PDUs), each of the status PDUs including reception status information of received data PDUs and indication information including an identifier for identifying the status report; and a control module configured to control starting a status reassembly timer related to the status report at the same time with reception of a first status PDU of the plurality of status PDUs;

wherein the wireless communication module is further configured to transmit a handover command to a transmitting side, and wherein the control module is further configured to control performing a handover regardless of whether all of the plurality of status PDUs are reported if the status reassembly timer expires.

10. An apparatus for transmitting a status report in a mobile communication system, the apparatus comprising:

a controller module configured to control configuring a status report using a plurality of status protocol data units (PDUs), wherein each of the status PDUs includes reception status information of received data PDUs and indication information including an identifier for identifying the status report;

a wireless communication module configured to transmit the status report;

wherein the controller module is further configured to control starting a status transmission timer related to the status report at the same time with transmission of a first status PDU of the plurality of status PDUs;

wherein the wireless communication module is further configured to receive a handover command from a first cell or sector, and wherein the controller module is further configured to control performing a handover regardless of whether each reception result for all of the plurality of status PDUs is reported if the status transmission timer expires.

* * * * *